(12) United States Patent
Matsuoka et al.

(10) Patent No.: US 8,294,576 B2
(45) Date of Patent: Oct. 23, 2012

(54) INFRARED SENSOR SWITCH

(75) Inventors: Makiko Matsuoka, Kadoma (JP); Tomohiro Ieki, Tsu (JP); Koji Yokota, Tsu (JP); Hajime Yabu, Matsusaka (JP); Susumu Nakano, Tsu (JP); Kei Miura, Tsu (JP)

(73) Assignee: Matsushita Electric Works, Ltd., Kadoma (JP)

( * ) Notice: Subject to any disclaimer, the term of this patent is extended or adjusted under 35 U.S.C. 154(b) by 1594 days.

(21) Appl. No.: 11/783,785

(22) Filed: Apr. 12, 2007

(65) Prior Publication Data

US 2007/0241896 A1 Oct. 18, 2007

(30) Foreign Application Priority Data

Apr. 12, 2006 (JP) ................................. 2006-110294

(51) Int. Cl.
*G08B 13/18* (2006.01)
(52) U.S. Cl. ................. 340/567; 340/693.5; 340/693.11
(58) Field of Classification Search .................. 340/567, 340/693.5, 693.9, 693.11; 250/221; 362/276
See application file for complete search history.

(56) References Cited

U.S. PATENT DOCUMENTS

| | | | |
|---|---|---|---|
| 6,122,678 A * | 9/2000 | Eckel et al. | 340/567 |
| 6,369,688 B1 | 4/2002 | Abe et al. | |
| 6,781,129 B2 | 8/2004 | Leen | |
| 2006/0146537 A1 * | 7/2006 | Murray et al. | 362/276 |

FOREIGN PATENT DOCUMENTS

| | | |
|---|---|---|
| JP | 03-191843 A | 8/1991 |
| JP | 4-55728 | 2/1992 |
| JP | 05-325752 A | 12/1993 |
| JP | 05-325753 A | 12/1993 |
| JP | 6-245282 | 9/1994 |
| JP | 09-223442 A | 8/1997 |
| JP | 10-070776 A | 3/1998 |
| JP | 11-273880 A | 10/1999 |
| JP | 2000-131456 A | 5/2000 |
| JP | 2003-281983 A | 10/2003 |
| JP | 2004-205299 A | 7/2004 |
| JP | 2005-135631 | 5/2005 |
| TW | 457364 B | 10/2001 |
| WO | WO-2004/088799 | 10/2004 |

OTHER PUBLICATIONS

Notification of Reasons for Refusal dated Jul. 20, 2010.
Office Action mailed Jun. 19, 2009, issued on the Chinese application No. 200710095850.4.
Notification for the Opinion of the Examiner for Taiwanese Patent Application No. 096112711 issued Aug. 1, 2011.
Office Action dated May 26, 2008, issued in the prosecution of the corresponding Korean patent application and its brief translation.

* cited by examiner

*Primary Examiner* — Thomas Mullen
(74) *Attorney, Agent, or Firm* — Edwards Wildman Palmer LLP; James E. Armstrong, IV; Brian R. Landry

(57) ABSTRACT

An infrared sensor switch of the invention comprises an infrared sensor with a detection range, and a controller that uses the sensor to try to detect whether or not a person is present in the detection range and controls an ON or OFF state of a corresponding load unit based on each detection result obtained from the sensor. The switch further comprises a sensor block comprising the sensor, and a housing that is mounted in a wall and retains the block so that the center axis of the detection range can be rotated about a horizontal axis and as well as rotated up to at least 40 degrees downward from a forward direction of 0 degrees.

13 Claims, 17 Drawing Sheets

INFRARED SENSOR SWITCH

TECHNICAL FIELD

The invention relates generally to infrared sensor switches and more particularly to an infrared sensor switch that uses an infrared sensor to try to detect whether or not a person is present in a detection range of the sensor and controls an ON or OFF state of a corresponding load unit based on the detection result.

BACKGROUND ART

This sort of infrared sensor switch is installed on, for example, a ceiling, a wall or the like to be utilized as an energy-saving unit. For example, a terminal unit described in Japanese Patent Application Publication No. H6-245282 issued Sep. 2, 1994 is installed on a wall. This unit comprises a printed circuit board on which an infrared sensor is mounted, and a rotating frame that retains the board and is rotated about a vertical axis through a direction adjusting knob. In case of this unit, an axis toward a center of a detection range of the infrared sensor can be rotated about the vertical axis. However, since the positions of the top and bottom ends of the detection range are not changed, a human body cannot be detected in case that the unit is installed at a high place on a wall.

An infrared sensor switch described in Japanese Patent Application Publication No. H4-55728 issued Feb. 24, 1992 is installed on an outdoor wall. This switch comprises a sensor block that includes an infrared sensor (pyroelectric element) and is rotated about a horizontal axis. In case of this switch, since the axis toward the center of a detection range of the infrared sensor can be rotated about the horizontal axis, the positions of the top and bottom ends of the detection range can be changed. However, the axis toward the center of the detection range is rotated up and down from 45 degrees below but the axis cannot be directed to the forward direction, and therefore a human body may not be detected in case that the switch is installed at a lower position than a person.

DISCLOSURE OF THE INVENTION

It is therefore an object of the present invention to certainly detect a human body even if an infrared sensor switch of the invention is installed on a wall at a position higher or lower than a person.

An infrared sensor switch of the present invention comprises an infrared sensor with a detection range, and a controller. The controller comprises the sensor for detecting whether or not a person is present in the detection range and controls an ON or OFF state of a corresponding load unit based on each detection result obtained from the sensor. The switch further comprises a sensor block comprising the sensor, and a housing. The housing is mounted in a wall and retains the block so that an axis toward a center of the detection range can be rotated about a horizontal axis as well as rotated up to at least 40 degrees downward from a forward direction of 0 degrees. In this construction, even if the infrared sensor switch is installed at a position higher or lower than a person, a human body can be detected certainly.

In a preferred embodiment, the infrared sensor switch further comprises an address storage and a transmitter. The address storage stores an address related to the corresponding load unit. The transmitter transmits, based on specified multiplexing, a transmission signal to the corresponding load unit through a main control unit. The main control unit transmits the transmission signal based on a relationship between the address stored in the storage and the address related to the corresponding load unit based on the specified multiplexing. The corresponding load unit comprises at least one load, a receiver and a controller. The receiver is configured to receive, based on the specified multiplexing, a transmission signal from the main control unit. When a transmission signal including the address assigned to the load unit is received by the receiver, the controller of the load unit controls an ON or OFF state of said at least one load in accordance with an ON or OFF control code included in the transmission signal, respectively. The controller of the infrared sensor switch transmits a transmission signal including an ON or OFF control code to the corresponding load unit through the main control unit by generating a transmission signal including monitor data corresponding to an ON or OFF control code as well as the address stored in the storage based on detection result obtained from the sensor to transmit the transmission signal to the main control unit through the transmitter. In this construction, a remote monitor/control system can be constructed with the main control unit, infrared sensor switches and load units.

In an embodiment, the infrared sensor switch further comprises a receiver for receiving an address from an external adapter. This adapter comprises an input device for entering the address and a transmitter for transmitting the address entered through the input device to the infrared sensor switch. When the receiver of the infrared sensor switch receives an address from the adapter, the controller of the infrared sensor switch stores the received address in the address storage. In this construction, the address related to the corresponding load unit can be easily set to the infrared sensor switch.

In a preferred embodiment, the transmitter of the adapter is a wireless transmitter, while the receiver of the infrared sensor switch is a wireless receiver. In this construction, even if the infrared sensor switch is installed at a position higher than a person, the address related to the corresponding load unit can be easily set to the switch.

In an alternate embodiment, the adapter is an address setting unit that is installed on a wall at a position lower than a person. In this construction, even if the infrared sensor switch is installed at a position higher than a person, the address related to the corresponding load unit can be easily set to the switch.

In an embodiment, the infrared sensor switch further comprises a brightness sensor that detects an ambient brightness level. In this case, the load is a luminaire and the controller of the infrared sensor switch keeps the load turned off regardless of each detection result obtained from the infrared sensor when the level detected by the brightness sensor is higher than a brightness reference level. In this construction, power consumption can be suppressed more effectively.

In an enhanced embodiment, the infrared sensor switch further comprises an indicator for indicating each detection result obtained from the infrared sensor. Based on each detection result obtained from the infrared sensor, the controller of the infrared sensor switch drives the indicator so as to indicate each detection result obtained from the infrared sensor. In this construction, the detection result obtained from the infrared sensor can be easily seen.

In an embodiment, the infrared sensor switch further comprises a holding time adjuster. This adjuster is used to adjust a holding time for holding ON state of the load unit from a point in time at which the detection result that a person is present in the detection range is obtained from the infrared sensor. The controller of the infrared sensor switch keeps the load unit turned on during the holding time after the detection result that a person is present in the detection range is obtained from the infrared sensor. In this construction, the ON state of the load unit can be suitably adjusted in response to the holding time adjusted through the adjuster.

In an embodiment, the sensor block has graduations each of which represents an inclination of the axis toward the center of the detection range. In this construction, the axis toward the center of the detection range can be easily adjusted to a desired inclination angle.

In an embodiment, the infrared sensor switch further comprises a forced-ON switch and a forced-OFF switch. The controller of the infrared sensor switch is configured to transmit a transmission signal including the ON control code to the corresponding load unit through the main control unit regardless of each detection result obtained from the infrared sensor when the forced-ON switch is operative. The transmission signal is transmitted by generating a transmission signal including monitor data corresponding to the ON control code as well as the address stored in the address storage to transmit the transmission signal to the main control unit through the transmitter. The controller of the infrared sensor switch is also configured to transmit a transmission signal including the OFF control code to the corresponding load unit through the main control unit regardless of each detection result obtained from the infrared sensor when the forced-OFF switch is operative. The transmission signal is transmitted by generating a transmission signal including monitor data corresponding to the OFF control code as well as the address stored in the address storage to transmit the transmission signal to the main control unit through the transmitter. In this construction, it is easy to check whether or not the load unit corresponding to the infrared sensor switch turns on and off.

In an embodiment, the infrared sensor switch with the holding time adjuster further comprises a forced-ON switch and a forced-OFF switch included in the adjuster. The controller of the infrared sensor switch is configured to transmit a transmission signal including the ON control code to the corresponding load unit through the main control unit regardless of each detection result obtained from the infrared sensor when the forced-ON switch is operative. The transmission signal is transmitted by generating a transmission signal including monitor data corresponding to the ON control code as well as the address stored in the address storage to transmit the transmission signal to the main control unit through the transmitter. The controller of the infrared sensor switch is also configured to transmit a transmission signal including the OFF control code to the corresponding load unit through the main control unit regardless of each detection result obtained from the infrared sensor when the forced-OFF switch is operative. The transmission signal is transmitted by generating a transmission signal including monitor data corresponding to the OFF control code as well as the address stored in the address storage to transmit the transmission signal to the main control unit through the transmitter. In this construction, it is easy to check whether or not the load unit corresponding to the infrared sensor switch turns on and off. In addition, the number of parts can be decreased and manufacturing cost can be reduced.

In an embodiment, the infrared sensor switch further comprises a drive means for rotating the sensor block so that the axis toward the center of the detection range rotates about the horizontal axis. In accordance with an external signal including an UP or DOWN instruction, the controller of the infrared sensor switch rotates the block through the drive means so that the axis toward the center of the detection range is rotated about the horizontal axis at every specified interval of time. In this construction, even if the infrared sensor switch is installed on a wall at a position higher than a person, the axis toward the center of the detection range of the sensor can be easily adjusted to a desired angle.

In an embodiment, the housing retains the block so that the axis toward the center of the detection range can be rotated about the horizontal axis from the forward direction to a backward direction to hide a front of the sensor with the housing. In this construction, the sensor can be hidden with the housing to be protected.

In an embodiment, the housing retains the block so that the axis toward the center of the detection range can be rotated about the horizontal axis up to 180 degrees downward and then backward from the forward direction. In this construction, the sensor can be completely hidden within the housing and certainly protected.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
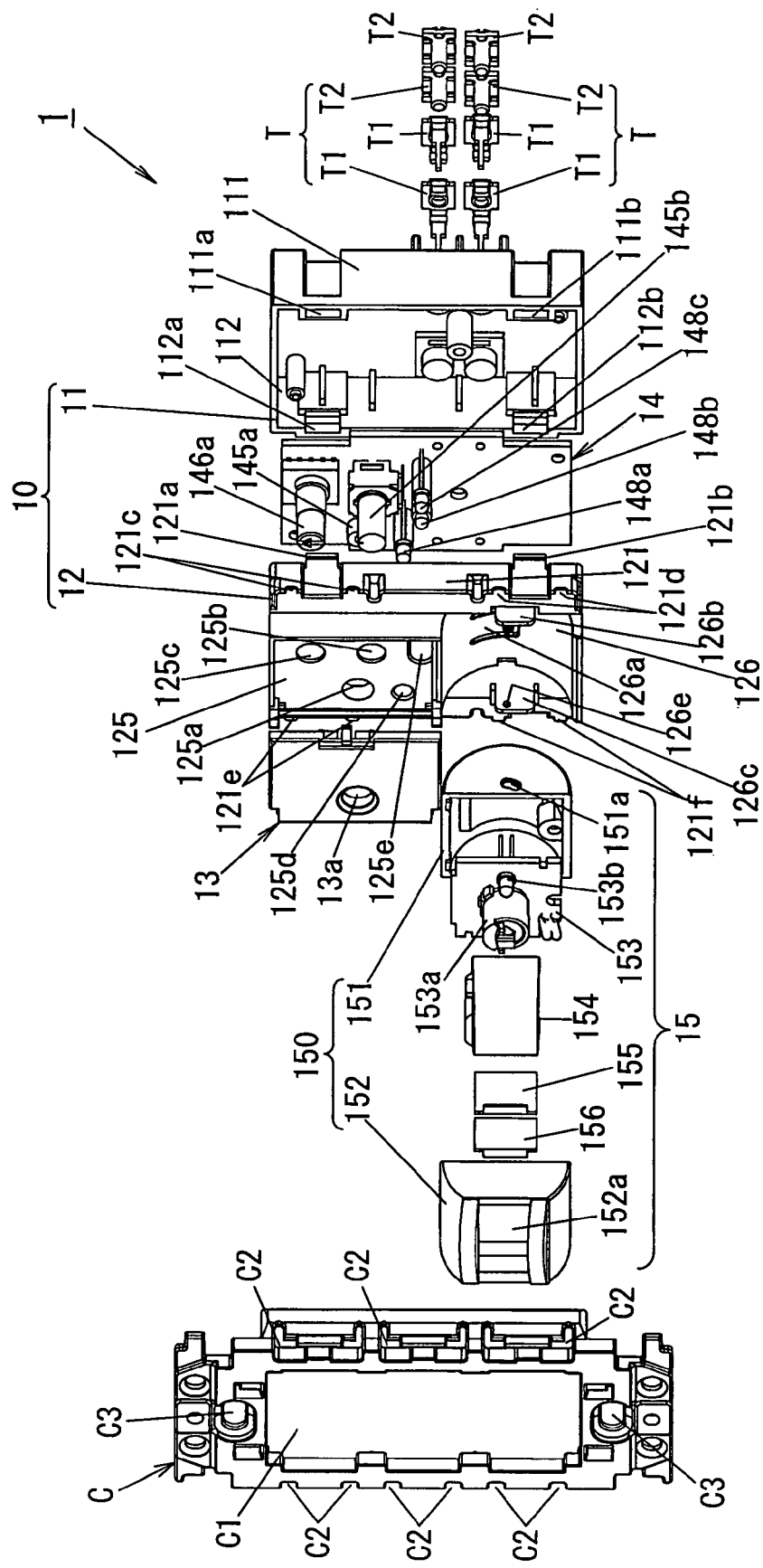
FIG. 1 is an exploded perspective view of a first embodiment according to the present invention.
Figure 2:
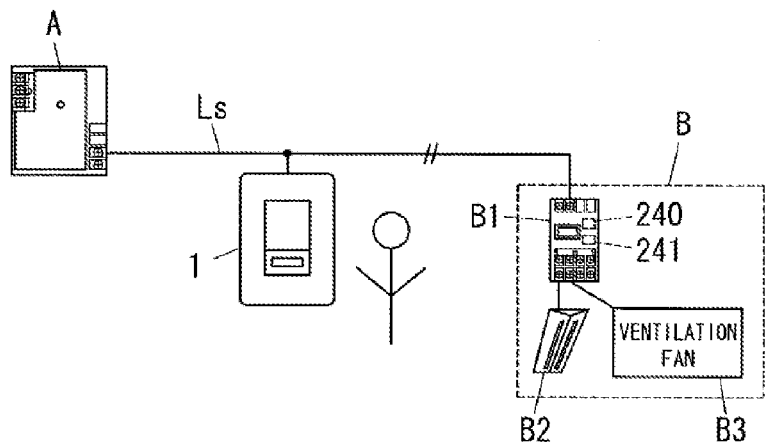
FIG. 2 is a schematic diagram of the system including an infrared sensor switch of FIG. 1.

FIGS. 1 and 2 show a first embodiment according to the present invention, i.e., an infrared sensor switch 1. As shown in FIG. 2, the switch 1 is connected with a main control unit A and a corresponding load unit B through two-wire signal cable Ls. This system of FIG. 2 is usually provided with load units (B) and switches (1).

Figure 3:
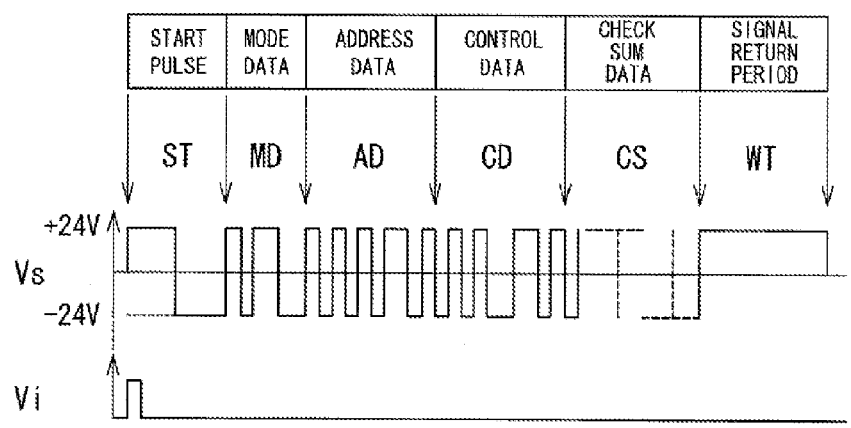
FIG. 3 is an explanatory diagram of a transmission signal and an interrupt signal.

The unit A includes a communication circuit functioning as a transmitter and a receiver. Based on time division multiplexing, the unit A sends out a transmission signal through the signal cable Ls, and sends and receives information to or from each unit B and each switch 1 through the transmission signal. As shown in FIG. 3, the transmission signal Vs is a time division multiplexing signal that is a bipolar signal of +/−24V and includes start pulse ST, mode data MD, address data AD, control data CD, error correction code CS and signal return period WT. The start pulse ST represents the start of the signal Vs. The mode data MD is data representing a mode of the signal Vs. The address data AD is data for identifying each of the units (B) and switches (1). The control data CD is data representing control instruction (control code) for a corresponding unit B. The error correction code CS is data such as check sum data for detecting transmission error. The signal return period WT is a time slot during which a corresponding unit B or switch 1 returns a return signal (monitor data). Each data transmission is by pulse width modulation.

The unit A is also provided with a dummy signal transmitting means and an interrupt handling means (not shown). The dummy signal transmitting means repeatedly generates a dummy signal and sends out the dummy signal as the transmission signal through the signal cable Ls. The mode data MD of each dummy signal is set to a dummy mode, and address data AD of each dummy signal is changed by rotation.

As shown in FIG. 3, when any switch 1 returns an interrupt signal Vi in synchronization with the start pulse ST of a dummy signal (transmission signal Vs), the interrupt handling means detects the switch 1 to access the switch 1. At this point, the interrupt handling means requests the monitor data, namely data for turning on or off the unit B related to the switch 1. When receiving the monitor data from the switch 1, the unit A generates and transmits a transmission signal based on the monitor data and the address of the switch 1. That is, the control data of the transmission signal is set to a control code corresponding to the monitor data, and the address data is set to the address of the load unit B related to the address of the switch 1. The relationship between each monitor data content and each control code is previously determined and is stored in a storage device of the unit A. The relationship between each address of switches (1) and each address of load units (B) is also previously determined and is stored in the storage device.

The unit B is constructed of a relay terminal unit B1 and at least one load connected to the unit B1. The unit B1 in an example of FIG. 2 is connected with a load B2 (luminaire) and a load B3 (ventilation fan). This unit B1 can be installed in, for example, a bathroom. The unit B (specifically the relay terminal unit B1) comprises a storage device (not shown) for storing previously assigned address, a communication circuit 241 for the above time division multiplexing, and a controller 240 for controlling at least one load. The communication circuit functions as a transmitter and a receiver. The power of the unit B1 is obtained through full wave rectification of each transmission signal. When receiving a transmission signal Vs from the unit A, the unit B1 judges whether or not the address of the address data included in the signal Vs agrees with the address of the storage device. When the address of the address data agrees with the address of the storage device, the unit B1 takes the control data included in the signal Vs and returns monitor data corresponding to the control data in synchronization with the signal return period of the signal Vs. At this point, the unit B1 connects a suitable low impedance between the two wires of the signal cable Ls and returns the monitor data by a current mode signal. The unit B1 then controls each load based on the control data (control code). The load B2 is turned on or off, or is dimmed based on the control data. The load B3 is turned on or off based on the control data. In addition, when receiving a periodic transmission signal (dummy signal) Vs from the unit A, the unit B1 judges whether or not the address of the address data included in the signal Vs agrees with the address of the storage device. If they agree with each other, the unit B1 returns monitor data corresponding to the condition of a load in synchronization with the signal return period of the signal Vs.

The switch 1 is constructed of a housing 10 put in a wall through a mount frame C, a main circuit block 14 put in the housing 10 and a sensor block 15 located on the lower part of the front of the housing 10.

Figure 4:
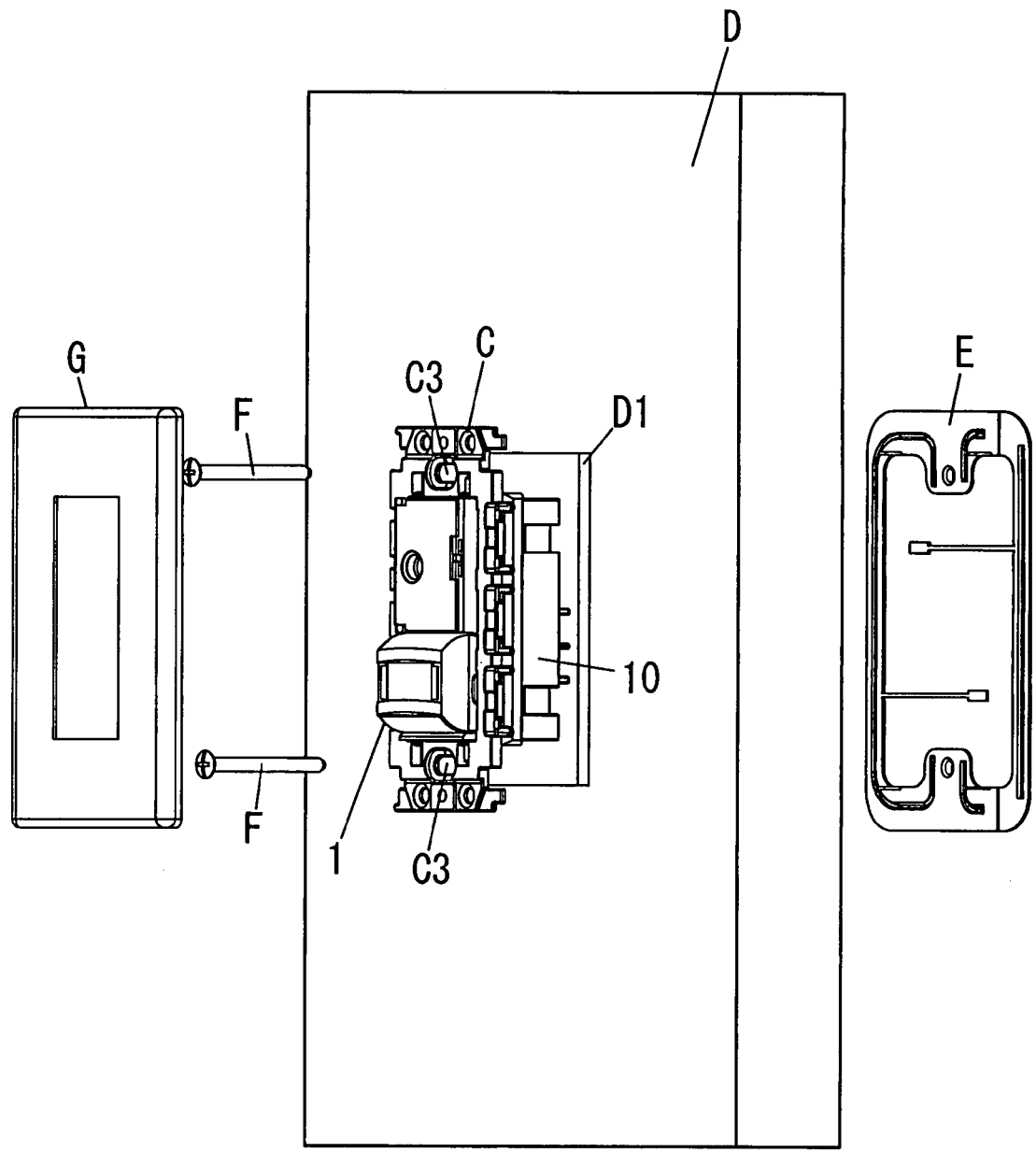
FIG. 4 is an explanatory diagram of installation of the infrared sensor switch on a wall.

As shown in FIG. 1, the frame C has a window hole C1 that is three times the size of a power socket module with two slits into which two parallel flat blades of a type-A power plug can only be inserted, and the module can be arranged up to three modules along the longitudinal direction of the frame C. That is, the frame C has three pair of retaining holes (C2) for retaining three modules. Each hole C2 is formed into a square bracket shape (i.e., "["). The upper and lower parts of the frame C are also formed with elliptic holes C3 and C3, respectively. As shown in FIG. 4, the frame C on which the switch 1 is mounted is located on the front of a wall D to face a metal fitting E located on the back of the wall D while putting the housing 10 of the switch 1 in a hole D1 of the wall D, and is fixed to the fitting E with two screws F and F. In addition, a front cover G is installed on the front of the frame C.

As shown in FIG. 1, the housing 10 is constructed of a case 11, a lid 12 and a cover 13 each of which is made from synthetic resin so that the size of the housing 10 is three times the size of the above power socket module. In addition, two pairs of terminals (T) are installed on the base 110 of the case 11. Each terminal T is comprised of a base T1 and a screw T2, and is electrically connected with the block 14. The upper and lower edges of right side 111 of the case 11 are formed with installing holes 111a and 111b, respectively, while the upper and lower edges of left side 112 of the case 11 are formed with installing holes 112a and 112b, respectively. The upper and lower edges of right side 121 of the lid 12 are formed with projections 121a and 121b which are inserted into the holes 111a and 111b, respectively. Similarly, the upper and lower edges of left side of the lid 12 are formed with projections which are inserted into the holes 112a and 112b, respectively. The tip of each projection is also formed with a hook. Therefore, if each projection is inserted into the corresponding installing hole, the lid 12 can be fixed to the case 11.

Also, the upper front end of right side 121 of the lid 12 is formed with protrusions 121c and 121c which are inserted into the retaining hole C2 in the right upper part of the frame C, while the lower front end of the right side 121 is formed with protrusions 121d and 121d which are inserted into the hole C2 in the right lower part of the frame C. Similarly, the upper front end of left side of the lid 12 is formed with protrusions 121e and 121e which are inserted into the hole C2 in the left upper part of the frame C, while the lower front end of the left side is formed with protrusions 121f and 121f which are inserted into the hole C2 in the left lower part of the frame C. Therefore, if each pair of protrusions are inserted into the corresponding hole C2, the housing 10 can be fixed to the frame C.

The front upper part 125 of the lid 12 is formed with through holes 125a, 125b, 125c, 125d and 125e, while the front lower part of the lid 12 is formed as a half-cylinder shaped cavity 126 of which axis is located horizontally. The bottom of the cavity 126 is formed with a rectangular elastic piece 126a of which tip is bent forward, and half-round ends of the cavity 126 are formed with retaining pieces 126b and 126c for retaining the sensor block 15. The cover 13 has a through hole 13a arranged in front of the hole 125a, and is attached to the left side of the front upper part 125 so that the cover 13 can be opened and closed.

Figure 5:
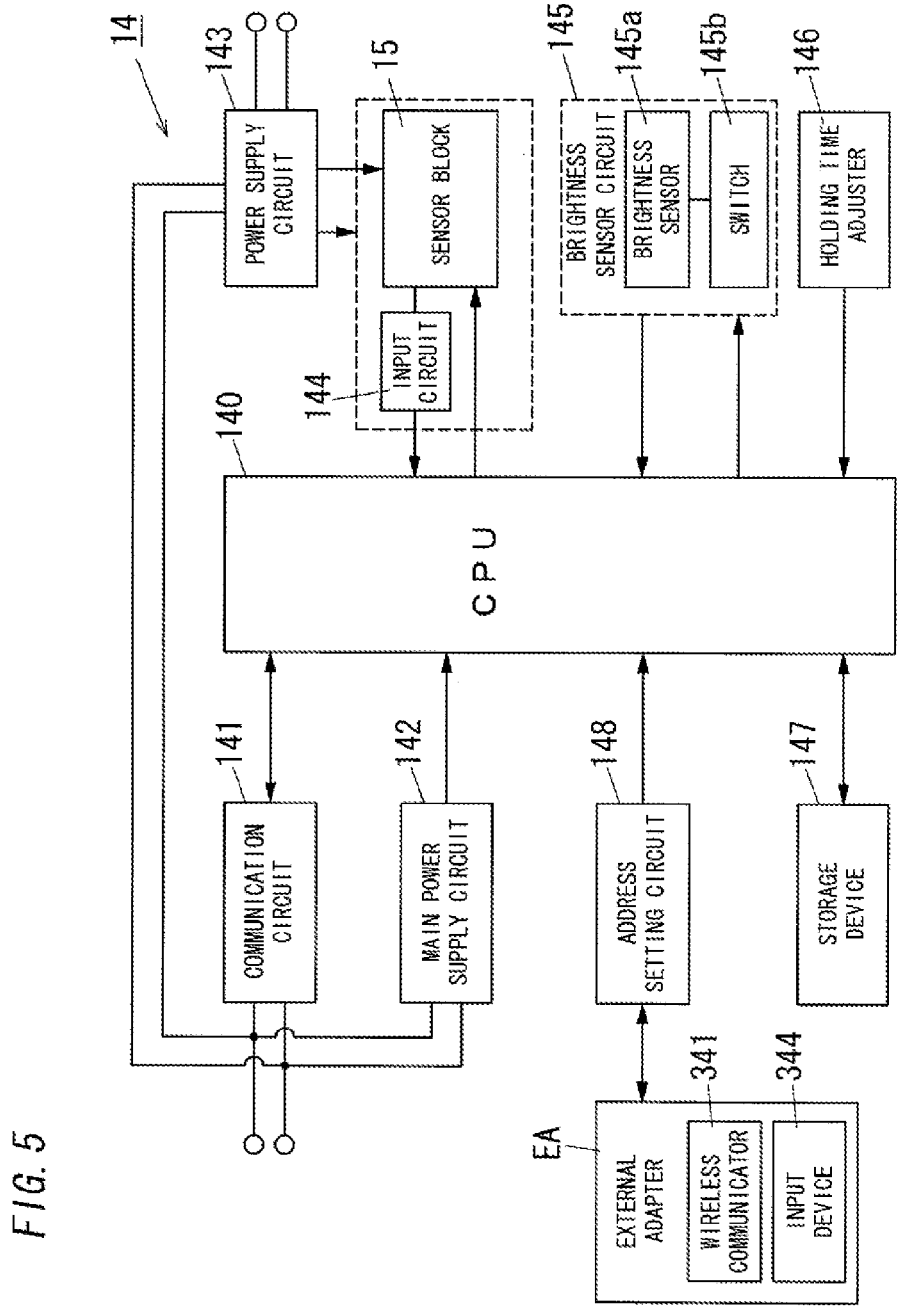
FIG. 5 is a circuit block diagram of the infrared sensor switch.

As shown in FIG. 5, the main circuit block 14 is constructed of a communication circuit 141 for the above time division multiplexing, a main power supply circuit 142, a power supply circuit 143 for the sensor block 15, an input circuit 144 for the block 15, a brightness sensor circuit 145, a holding time adjuster 146, a storage device 147, an address setting circuit 148, and a CPU 140. The circuits 141, 142 and 143 are connected with the signal cable Ls through one pair of terminals T and T. The circuit 141 functions as a transmitter and a receiver. The circuit 142 generates power through full wave rectification of each transmission signal obtained from the terminals, and supplies the power to the CPU 140 and so on. The circuit 143 generates power through full wave rectification of each transmission signal obtained from the terminals, and supplies the power to the block 15. Based on output of an infrared sensor 153a in the block 15, the circuit 144 tries to detect whether or not a person is present in a detection range of the sensor 153a, and supplies the detection result to the CPU 140.

Figure 6:
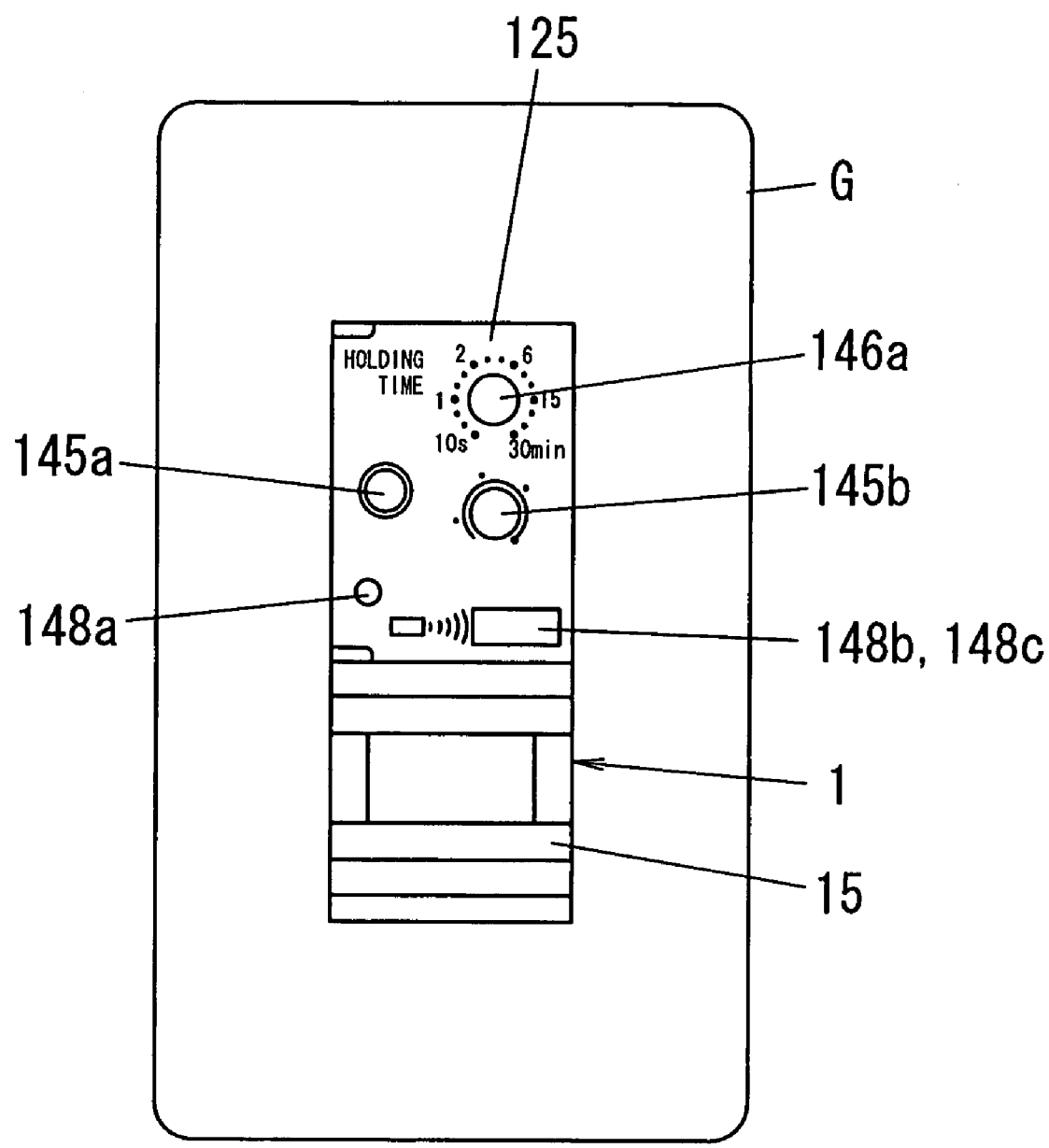
FIG. 6 is a front view of the infrared sensor switch which is installed on the wall and of which cover is removed from its lid.
Figure 7A:
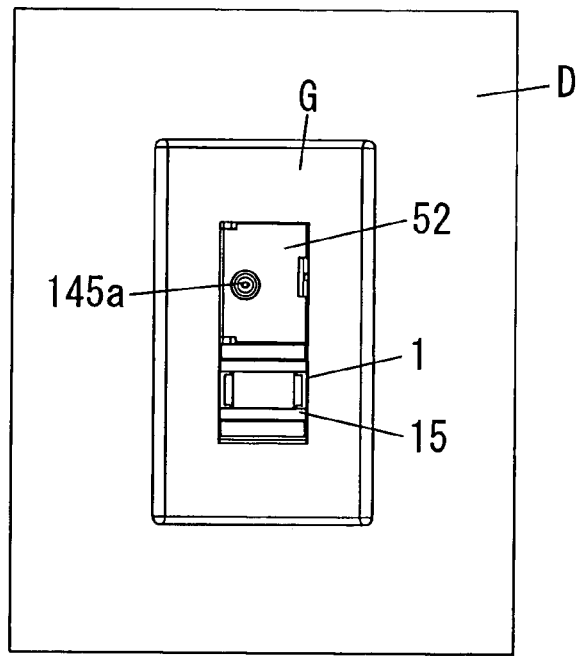
FIG. 7A is a front view of the infrared sensor switch which is installed on the wall and of which infrared sensor is directed forward.
Figure 7B:
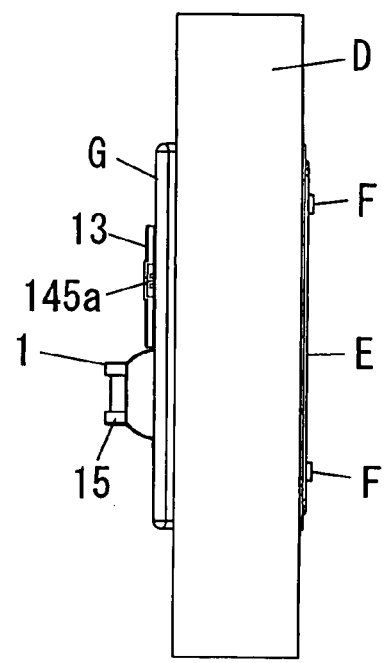
FIG. 7B is a side view of the switch of FIG. 7A.
Figure 7C:
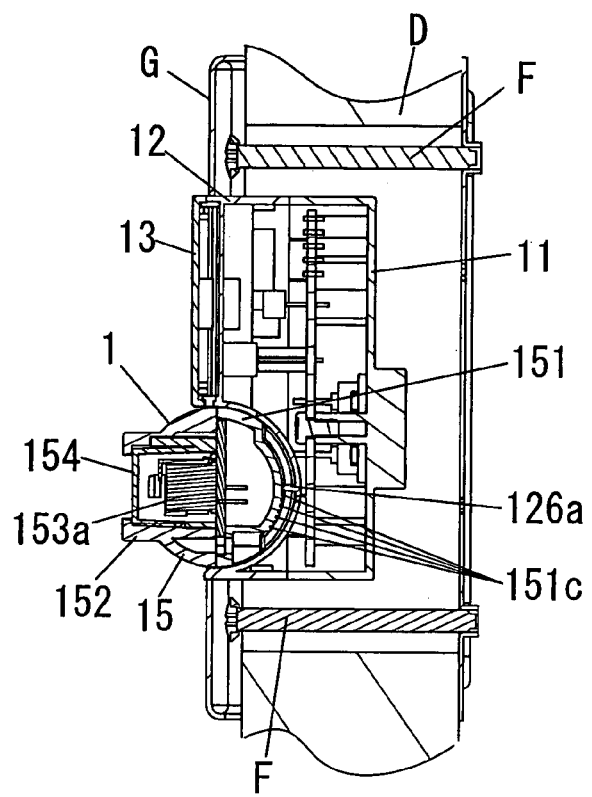
FIG. 7C is a sectional view of the switch of FIG. 7A.
Figure 7D:
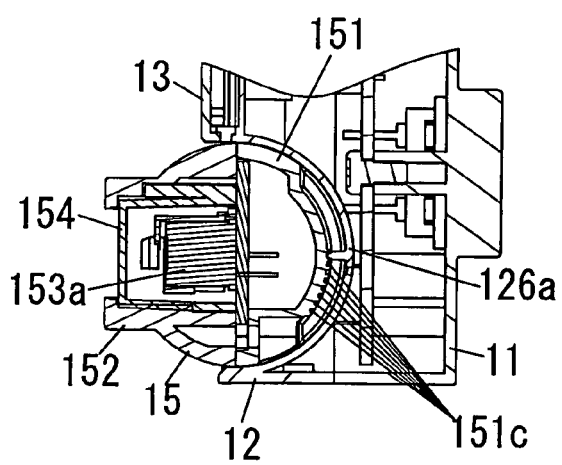
FIG. 7D is an enlarged sectional view of the switch of FIG. 7C.
Figure 8A:
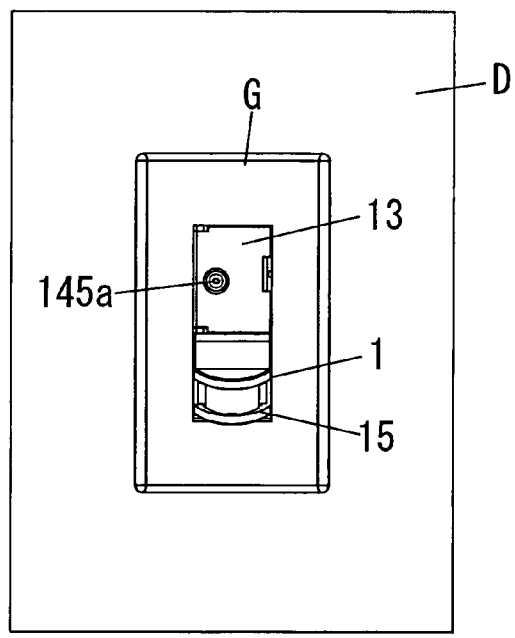
FIG. 8A is a front view of the infrared sensor switch which is installed on the wall and of which infrared sensor is directed diagonally downward.
Figure 8B:
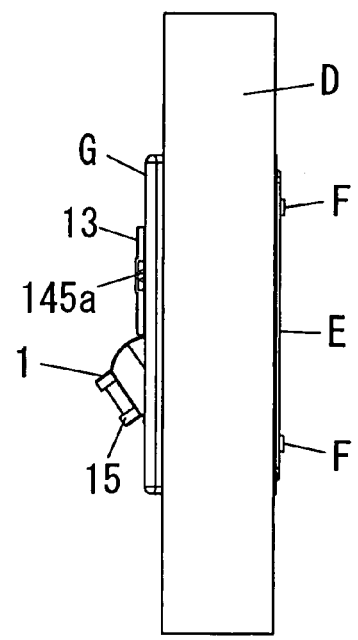
FIG. 8B is a side view of the switch of FIG. 8A.
Figure 8C:
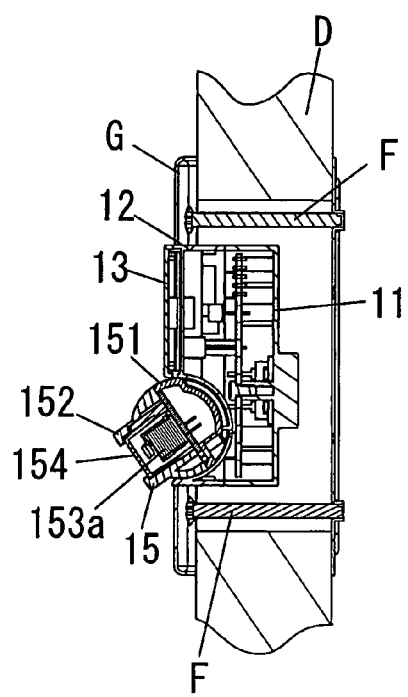
FIG. 8C is a sectional view of the switch of FIG. 8A.

As shown in FIGS. 1, 5 and 6, the circuit 145 is constructed with: a brightness sensor (e.g., CdS) 145a that is arranged behind the holes 13a and 125a and detects an ambient brightness level; a rotary switch 145b that is arranged behind the hole 125b and is used to adjust a brightness reference level; and so on. The brightness reference level can be set within a range from a minimum level (e.g., less than 5 Lx) to a maximum level (e.g., more than 100 Lx). When the switch 145b is also changed to an "Off" position out of the range, the function of the circuit 145 is suspended.

The adjuster 146 is constructed with a rotary switch 146a arranged behind the hole 125c, and so on. The switch 146a is used to adjust a holding time for holding in an ON state of the corresponding load unit B from a point in time at which the detection result that a person is present in the detection range is obtained from the sensor 153a. The holding time can be set, for example, within a range from 10 seconds to 30 minutes. In this construction, the ON state of the load unit can be suitably adjusted in response to the holding time adjusted by the adjuster 146. The storage device 147 is, for example, a non-volatile memory such as EEPROM, and stores the address related to the corresponding load unit. In the embodiment, the device 147 stores, for example, four different addresses each of which is constituted of a group number, a unit number and one of four different load numbers.

The circuit 148 comprises a switch 148a arranged behind the hole 125d, and a light-receiving element 148b and light-emitting element 148c arranged behind the hole 125e. The elements 148b and 148c are included in a wireless transmitting/receiving circuit which is used mainly to receive each address from an external adapter EA. This adapter EA comprises an input device 344 for entering each address and a wireless communicator 341 (e.g., wireless transmitter and receiver) for transmitting each address entered through the input device 344 to the infrared sensor switch 1. In this construction, each address related to the corresponding load unit can be easily set to the infrared sensor switch 1. In addition, even if the switch 1 is installed at a position higher than a person, each address related to the corresponding load unit can be easily set to the switch 1. The CPU 140 is described later.

Figure 9A:
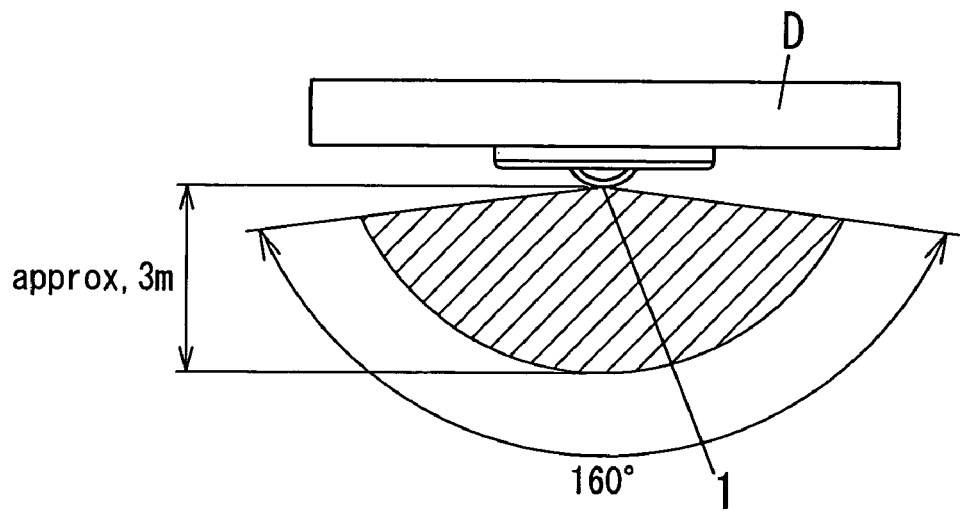
FIG. 9A is an explanatory diagram of a detection range (maximum horizontal angular distance, i.e., maximum azimuth) of the infrared sensor.
Figure 9B:
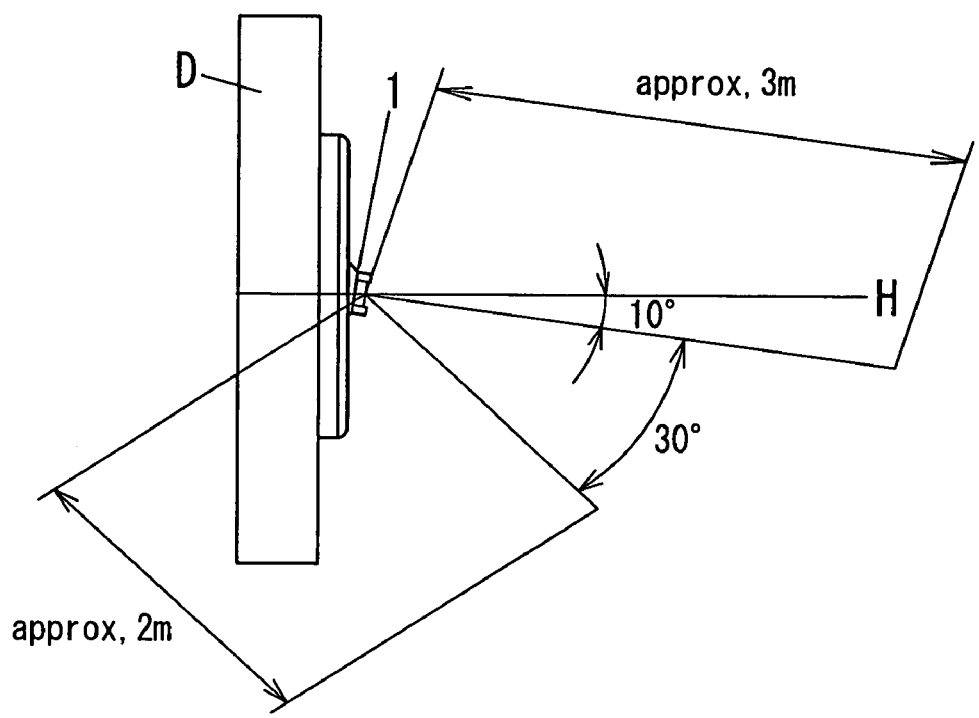
FIG. 9B is an explanatory diagram of a detection range (maximum vertical angular distance) of the infrared sensor.

As shown in FIG. 1, the sensor block 15 comprises a housing 150 made from synthetic resin, a sensor circuit block 153, a lens 154, and shutters 155 and 156. The housing 150 is constructed of a hollow body 151 shaped into a half-cylinder, and a hollow cover 152 that is shaped into a half-cylinder to have a rectangular window 152a at the front. The block 153 includes the infrared sensor 153a and an LED 153b (an indicator), and is put in the housing 150 and is connected with the power supply circuit 143 and the input circuit 144, for example, by conducting wires via corresponding through holes (not shown) of the body 151. The sensor 153a includes an element such as, for example, a pyroelectric element, and a mirror. The lens 154 is put in the housing 150 to be arranged in front of the sensor 153a. The shutters 155 and 156 are arranged in front of right and left sides of the lens 154 so that the shutters 155 and 156 can be rotated about the back ends of the shutters 155 and 156, respectively. The shutters 155 and 156 can be opened so that the detection range of the sensor 153a is spread up to 160° (see FIG. 9A).

As shown in FIGS. 1, 7A-7D, 8A-8C and 9A-9B, the housing 150 is retained by the retaining pieces 126b and 126c of the lid 12 so that an axis toward a center of the detection range of the sensor 153a can be rotated about a horizontal axis and rotated up to at least 40 degrees downward from the forward direction H of 0 degree. Concretely, a half-round shaped right side of the body 151 is formed with a hole 151a into which a protrusion (not shown) of the retaining piece 126b is inserted, while a half-round shaped left side of the body 151 is formed with a hole (not shown) into which a protrusion 126e of the retaining piece 126c is inserted. Each of these holes is located behind the rotation axis of the housing 150 and is formed into an arch with a length corresponding to 40 degrees mentioned above. In addition, the tip of elastic piece 126a is inserted into any of slits (151c) formed on the back of the body 151 and thereby the housing 150 is fixed to the housing 10. Therefore, the axis toward the center of the detection range can be rotated up to at least 40 degrees at every pitch (e.g., 5°) of slits (151c) downward from the forward direction.

The CPU 140 is configured to execute various instructions. For example, when the switch 148a is pushed, the CPU 140 monitors the output of the light-receiving element 148b, and when receiving each address from the above adapter through the element 148b, the CPU 140 stores each address into the storage device 147.

The CPU 140 also controls an ON or OFF state of the corresponding load unit based on each detection result obtained from the infrared sensor 153a through the input circuit 144. Concretely, if the detection result that a person is present in the detection range is obtained from the circuit 144, the CPU 140 turns the LED 153b (the indicator) on so as to indicate the detection result while the detection result is obtained. In this case, the detection result obtained from the sensor 153a can be easily seen. The CPU 140 also executes the following process at every address stored in the device 147. That is, the CPU 140 uses the communication circuit 141 to return an interrupt signal Vi in synchronization with the start pulse of a transmission signal from the unit A. Afterwards, if receiving the request of monitor data from the unit A, the CPU 140 returns the monitor data for turning on a load of the corresponding load unit (load corresponding to the load number) through the circuit 141.

After the holding time is adjusted through the holding time adjuster 146, the CPU 140 executes the same process as above at every address stored in the device 147. In this case, the monitor data is set to turn off a load of the corresponding load unit.

In addition, when the level detected by the brightness sensor 145a is higher than a brightness reference level adjusted through the switch 145b, the CPU 140 keeps the load B2 of the corresponding load unit turned off regardless of each detection result obtained from the infrared sensor 153a. In this construction, power consumption can be suppressed more effectively.

The angle adjustment of the sensor block 15 of the first embodiment is now explained. When the infrared sensor switch 1 is installed on a wall at a position higher than a person, the sensor block 15 can be moved so that the sensor 153a faces a person lower than the position and therefore it is possible to certainly detect a human body even if the switch 1 is installed on a wall at a position higher than a person. When the switch 1 is installed on a wall at a position lower than a person, the block 15 can be moved so that the sensor 153a faces a person higher than the position and therefore it is possible to certainly detect a human body even if the switch 1 is installed on a wall at a position lower than a person.

In an embodiment, the housing 10 retains the block 15 so that the axis toward the center of the detection range of the sensor 153a can be rotated up to at least 40 degrees downward from the forward direction and also can be rotated up to at least 40 degrees upward from the forward direction. That is, each hole of the half-round shaped right and left sides of the body 151 has a length corresponding to 80 degrees mentioned above. In this case, it is preferable that the same slits as the slits (151c) are formed on the upper back of the body 151.

Figure 10:
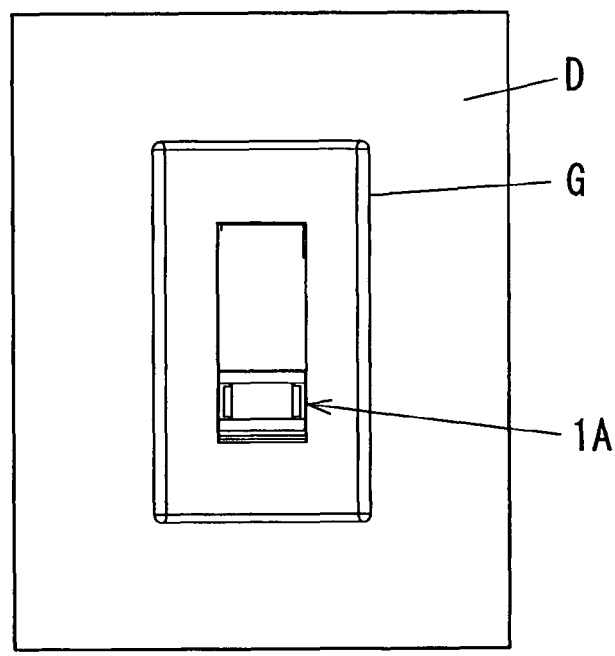
FIG. 10 is a front view of an embodiment.

In an embodiment, the above adapter is an address setting unit that is installed on a wall at a position lower than a person. In this case, the circuit 148 and the address setting unit may comprise a wired transmitting/receiving circuit and a wired communicator instead of the wireless transmitting/receiving circuit and the wireless communicator, respectively. The address setting unit may also be auxiliary infrared sensor unit including the same sensor block as the sensor block 15, which is connected with the power supply circuit 143 and the input circuit 144. As shown in FIG. 10, this auxiliary infrared sensor unit 1A may comprise a housing that is the same size as the above power socket module. In this case, the unit 1A can be attached to any position of the mount frame C. However, not limited to this, the unit 1A may comprise a housing that is two times the size of the module.

Figure 11:
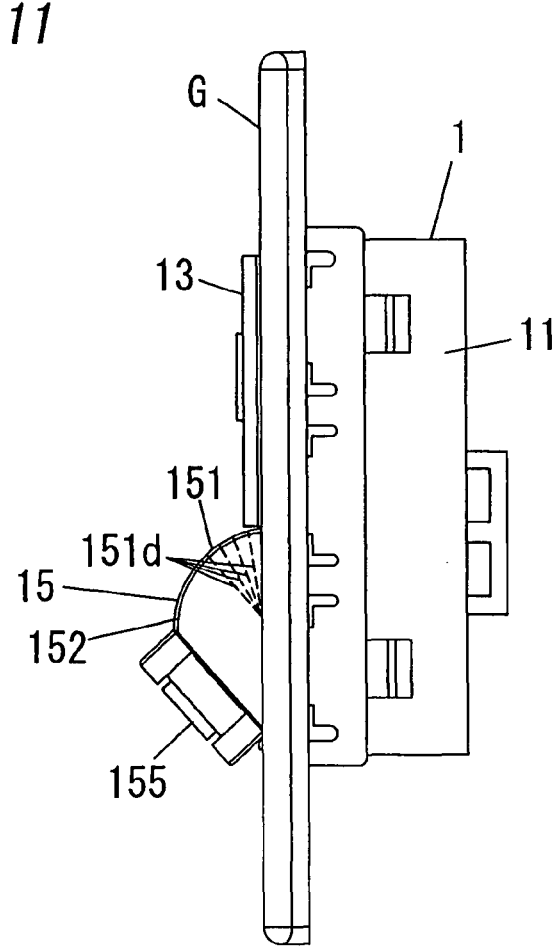
FIG. 11 is a side view of an embodiment.

In an embodiment, as shown in FIG. 11, the sensor block 15 has graduations (151d) each of which represents an inclination of the axis toward the center of the detection range of the sensor 153a. The graduations (151d) may be formed on at least one of the ends and the side of the housing 150 (or body 151). Each interval of the graduations is set to, for example, 5°. In this construction, the axis toward the center of the detection range can be easily adjusted to a desired inclination angle.

Figure 12:
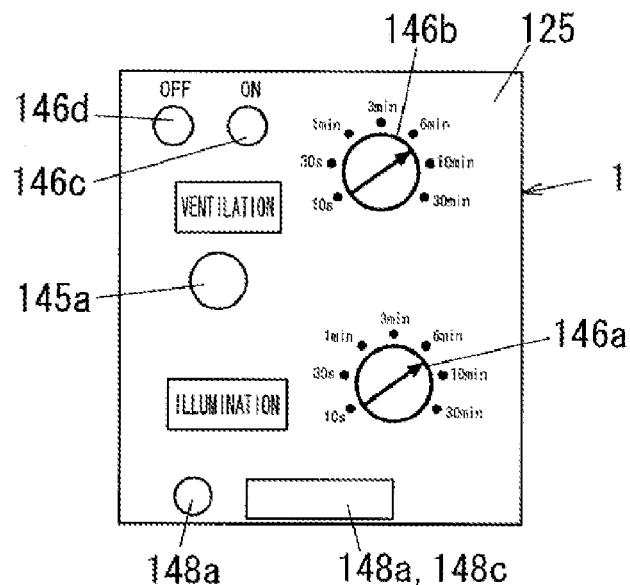
FIG. 12 illustrates the front upper part of an embodiment.

In an embodiment, as shown in FIG. 12, the infrared sensor switch 1 further comprises a forced-ON switch 146c and a forced-OFF switch 146d, while the adjuster 146 includes a rotary switch 146a for a luminaire (B2) and a rotary switch 146b for a ventilation fan (B3). Each of the switches 146c and 146d is, for example, a rotary switch, a push switch or the like. The switch 146a is used to adjust a holding time for holding ON state of the luminaire (B2) of the corresponding load unit B from a point in time at which the detection result that a person is present in the detection range is obtained from the sensor 153a. The switch 146b is used to adjust a holding time for holding ON state of the ventilation fan (B3) of the corresponding load unit B from a point in time at which the detection result that a person is present in the detection range is obtained from the sensor 153a. The CPU 140 is configured to transmit a transmission signal including the ON control code to the corresponding load unit B through the unit A regardless of each detection result obtained from the sensor 153a when the switch 146c is operative. The transmission signal is transmitted by generating a transmission signal including monitor data corresponding to the ON control code as well as the address stored in the storage 147 to transmit the transmission signal to the unit A through the circuit 147. The CPU 140 is also configured to transmit a transmission signal including the OFF control code to the corresponding load unit B through the unit A regardless of each detection result obtained from the sensor 153a when the switch 146d is operative. The transmission signal is transmitted by generating a transmission signal including monitor data corresponding to the OFF control code as well as the address stored in the storage 147 to transmit the transmission signal to the unit A through the circuit 141. In this construction, it is easy to check whether or not the load unit corresponding to the switch 1 turns on and off.

Figure 13:
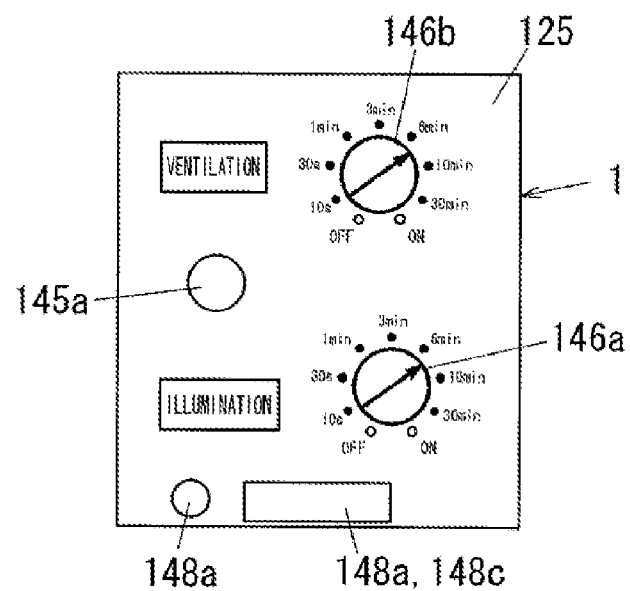
FIG. 13 illustrates the front upper part of an embodiment.

However, not limited to this, the forced-ON switch and the forced-OFF switch may be included in the adjuster 146. For example, as shown in FIG. 13, each of the switches 146a and 146b in the adjuster 146 may be provided with a forced-ON switch and a forced-OFF switch. In this case, the CPU 140 is configured to: transmit a transmission signal including the ON control code to the luminaire (B2) of the corresponding load unit through the unit A regardless of each detection result obtained from the sensor 153a when the forced-ON switch of the switch 146a is operative (ON); and to transmit a transmission signal including the OFF control code to the luminaire through the unit A regardless of each detection result obtained from the sensor 153a when the forced-OFF switch of the switch 146a is operative (OFF). Similarly, the CPU 140 is configured to: transmit a transmission signal including the ON control code to the ventilation fan (B3) of the corresponding load unit through the unit A regardless of each detection result obtained from the sensor 153a when the forced-ON switch of the switch 146b is operative (ON); and to transmit a transmission signal including the OFF control code to the fan through the unit A regardless of each detection result obtained from the sensor 153a when the forced-OFF switch of the switch 146b is operative (OFF). In this construction, it is easy to check whether or not each load of the load unit corresponding to the switch 1 turns on and off. In addition, the number of parts can be decreased and manufacturing cost can be reduced.

In an alternate embodiment, the address setting circuit 148 is a dipswitch arranged behind the hole 125e instead of the elements 148b and 148c, and the above external adapter is not provided. However, not limited to this, the dipswitch may be located on the back of the housing 10.

Figure 14A:
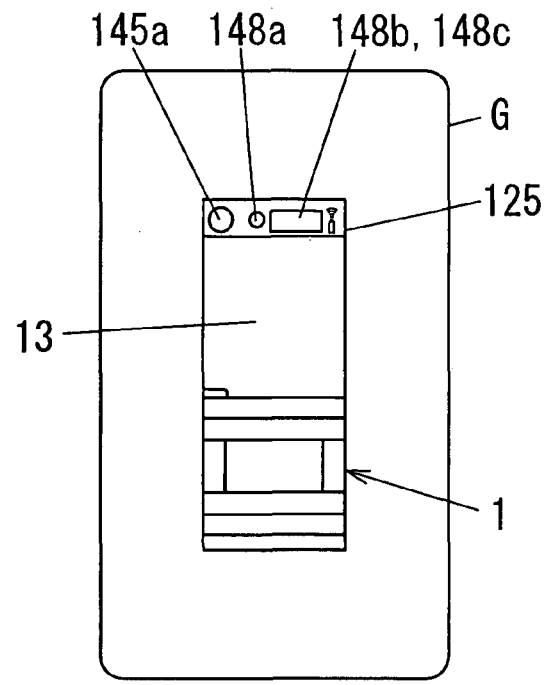
FIG. 14A illustrates the front upper part of an embodiment.
Figure 14B:
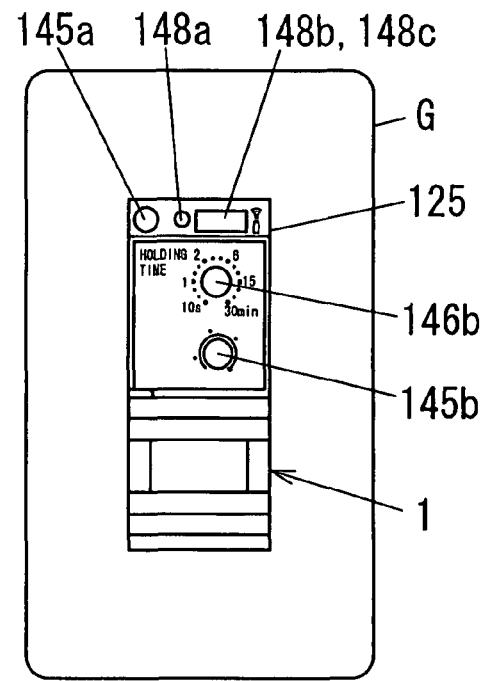
FIG. 14B illustrates the front upper part of the embodiment of FIG. 14A, of which cover is removed from its lid.
Figure 15A:
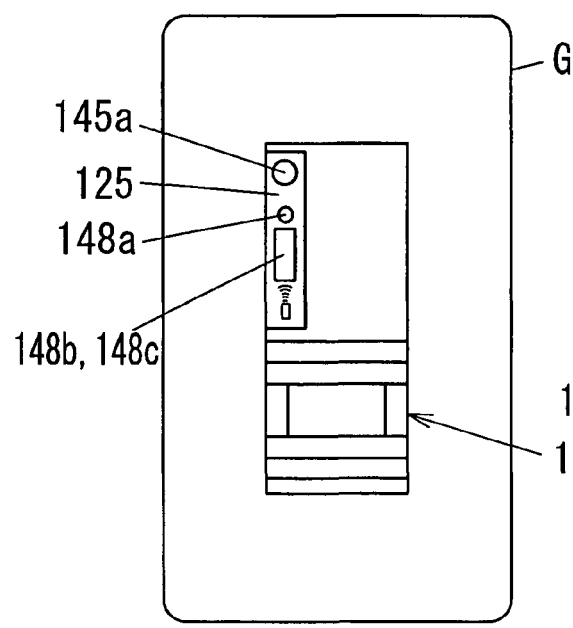
FIG. 15A illustrates the front upper part of an embodiment.
Figure 15B:
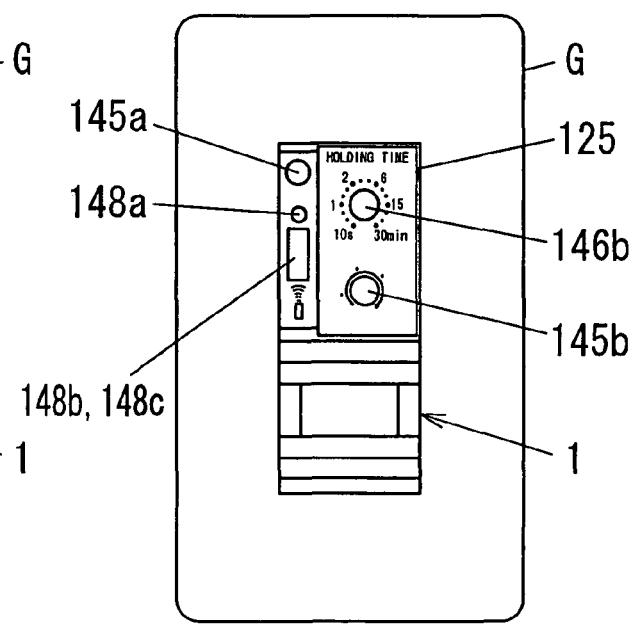
FIG. 15B illustrates the front upper part of the embodiment of FIG. 15A, of which cover is removed from its lid.

In an embodiment, the infrared sensor switch 1 may comprise a cover 13 smaller than that of FIG. 1 so that the brightness sensor 145a, the switch 148a, and the elements 148b and 148c are located at a part of the front upper part 125, which is not covered by the cover 13. For example, the sensor 145a, the switch 148a, and the elements 148b and 148c may be located at the upper end of the front upper part 125 as shown in FIGS. 14A and 14B, or may be located at the left end of the front upper part 125 as shown in FIGS. 15A and 15B. In any of these cases, each address can be set to the switch1 without opening the cover 13. In addition, the sensor 145a can be efficiently located not to be disturbed by the cover 13.

Figure 16A:
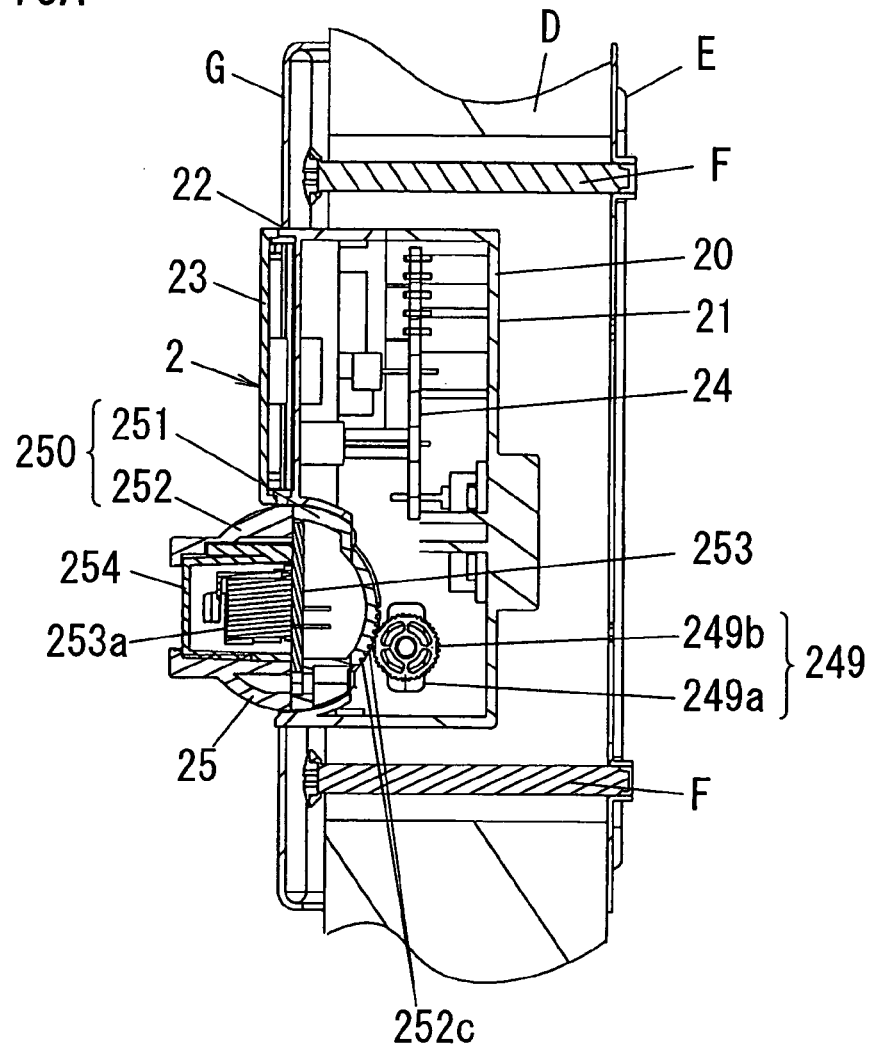
FIG. 16A is a sectional view of a second embodiment according to the present invention.
Figure 16B:
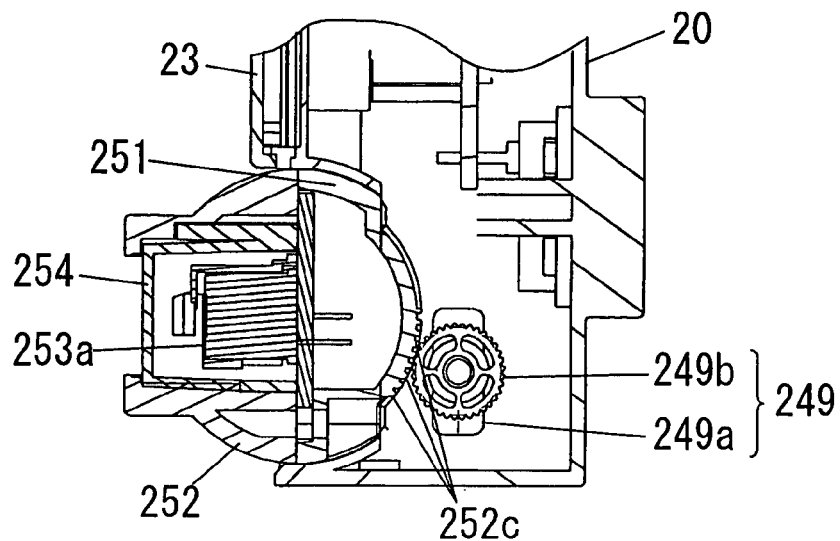
FIG. 16B is an enlarged sectional view of the switch of FIG. 16A.

FIGS. 16A and 16B show a second embodiment according to the present invention, i.e., an infrared sensor switch 2. In addition to a housing 20 and a sensor block 25 which are configured in the same way as the first embodiment, the switch 2 comprises a main circuit block 24 further including a drive circuit 249. That is, the housing 20 comprises a case 21, a lid 22 and a cover 23, while the block 25 comprises a housing 250 (body 251 and cover 252), a sensor circuit block 253 (infrared sensor 153a, etc.), a lens 254 and shutters (not shown).

The circuit 249 is constructed with a servo motor 249a, a gear 249b and so on. The motor 249a is driven by the CPU of the block 24 in accordance with an instruction (e.g., UP or DOWN instruction) entered through a remote controller (not shown) and the wireless transmitting/receiving circuit of the address setting circuit in the block 24. The gear 249b is attached to the motor 249a and engages with slits (251c) of the body 251. In this construction, even if the switch 2 is installed on a wall at a position higher than a person, the axis toward the center of the detection range of the sensor 253a can be easily adjusted to a desired angle.

In an alternate embodiment, the motor 249a is driven by the CPU in accordance with an instruction (e.g., UP or DOWN instruction) entered through a switch (e.g., up/down switch) installed on a wall instead of the above remote controller. In this case, the switch 2 may comprise a wired transmitting/receiving circuit instead of the wireless transmitting/receiving circuit.

Figure 17A:
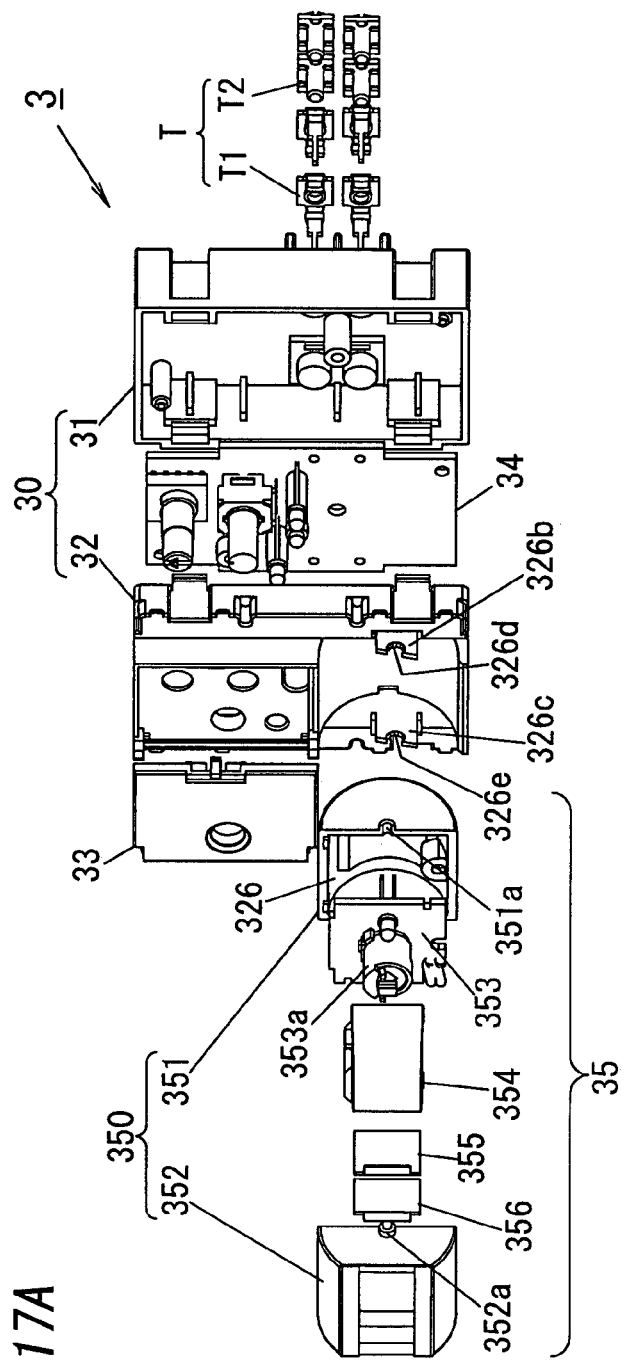
FIG. 17A is an exploded perspective view of a third embodiment according to the present invention.
Figure 17B:
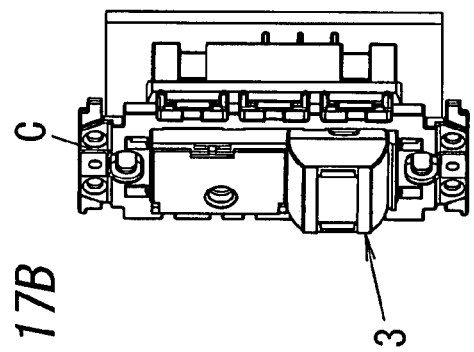
FIG. 17B is a perspective view of the third embodiment.

FIGS. 17A and 17B show a third embodiment according to the present invention, i.e., an infrared sensor switch 3. The switch 3 is constructed of a housing 30, a main circuit block 34 and a sensor block 35, and is characterized by the block 35 retained by the housing 30 so that an axis toward a center of a detection range of an infrared sensor 153a in the block 35 can be rotated about a horizontal axis from forward to backward.

Figure 18:
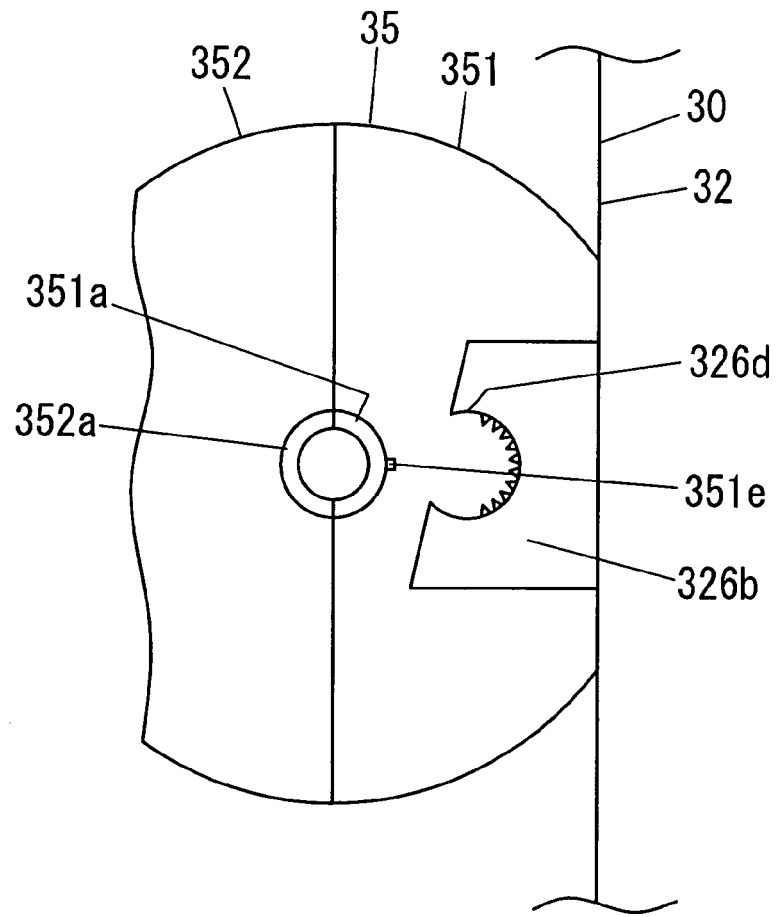
FIG. 18 illustrates an essential part of the third embodiment.

That is, in addition to a case 31 and a cover 33 which are configured in the same way as the first or the second embodiment, the housing 30 comprises a lid 32 that has retaining pieces 326b and 326c formed with toothed notches 326d and 326e, respectively, as shown in FIGS. 17A and 18 in stead of the elastic piece 126a and the protrusions (126e). The lower part of each retaining piece (notch) protrudes to prevent the block 35 from falling. On the other hand, the block 35 comprises a housing 350 of which each round end is formed with a tubular axis (rotation axis) in addition to a sensor circuit block 353, a lens 354, and shutters 355 and 356 which are configured in the same way as the first or the second embodiment. Concretely, the half-round shaped right side of a body 351 of the housing 350 is formed with a half-tubular projection 351a, while the half-round shaped right side of a cover 352 of the housing 350 is formed with a half-tubular projection 352a constituting the tubular axis together with the projection 351a. The projection 351a is also formed with a protrusion 351e which engages with the toothed notch 326d. Similarly, each half-round shaped left side of the body 351 and the cover 352 is formed with a half-tubular projection, and the projection of the body 351 is formed with a protrusion which engages with the toothed notch 326e. The pitch of teeth of each notch is set to, for example, 5°.

Figure 19:
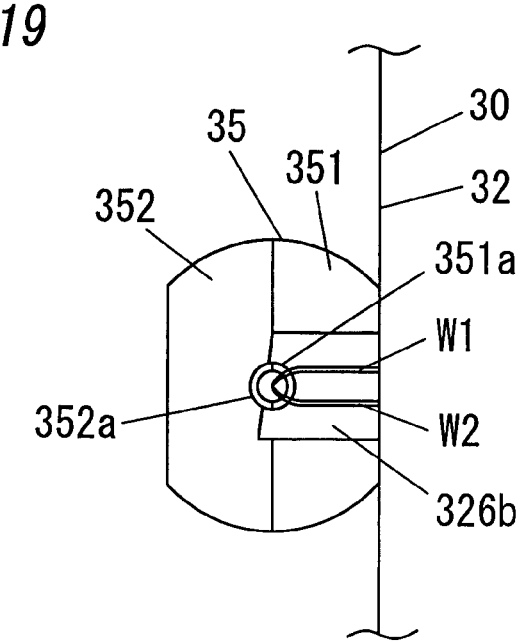
FIG. 19 illustrates the essential part.

The block 353 is connected with the power supply circuit and the input circuit in the block 34 through each conducting wire inserted into at leas one of the above tubular axes. In an example of FIG. 19, the block 353 is connected with one of the power supply circuit and the input circuit through two wires W1 and W2 inserted into the right tubular axis, and is connected with the other through two wires inserted into the left tubular axis.

In this construction, for example, in case that the sensor 353a is suspended and the switch 3 only functions by the brightness sensor circuit, if the axis toward the center of the detection range of the sensor 353a is rotated from forward to backward, the sensor 353a can be hidden within the cavity 326 of the lid 32 of the housing 30 to be protected. In this case, the load (luminaire) of a corresponding load unit is turned off if an ambient brightness level is higher than a brightness reference level, and otherwise is turned on. In addition, in case that the sensor 353a is used, the axis toward the center of the detection range can be rotated up to 40 degrees per 5° upward or downward from a forward direction.

In an embodiment, the housing 30 retains the sensor block 35 so that the axis toward the center of the detection range of the sensor 353a can be rotated about the horizontal axis up to 180 degrees downward and backward from the forward direction. In this construction, the sensor 353a can be completely hidden within the cavity of the housing 30 and certainly protected.

Figure 20:
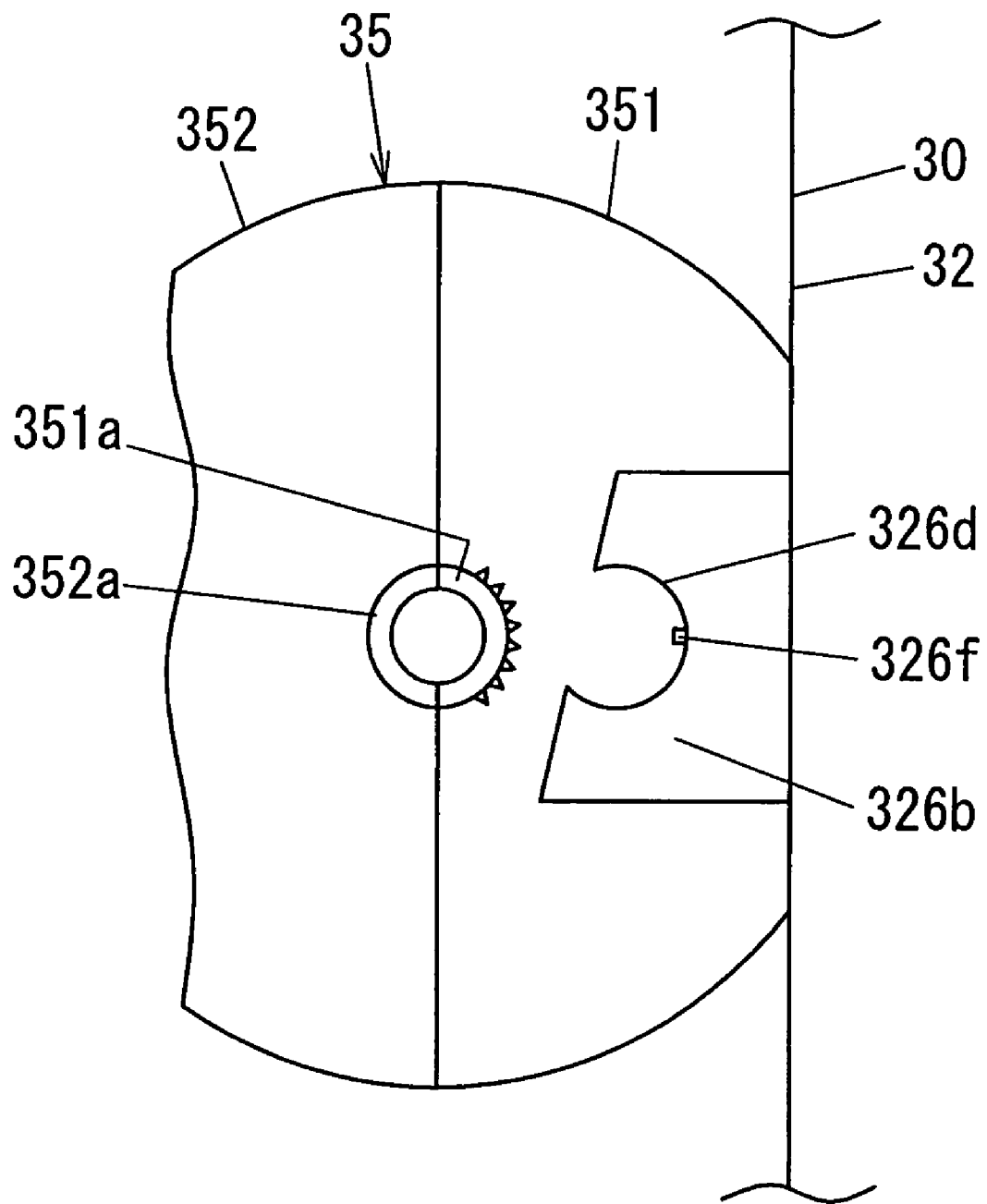
FIG. 20 illustrates an essential part of an embodiment.

In an embodiment, as shown in FIG. 20, the notch 326d of the retaining piece 326b is formed with a protrusion 326f instead of the teeth, while the half-tubular projection 351a is toothed in stead of the protrusion 351e. Similarly, the notch 326e of the retaining piece 326c is formed with a protrusion, while the left projection is toothed. The pitch of teeth of each projection is set to, for example, 5°.

Figure 21A:
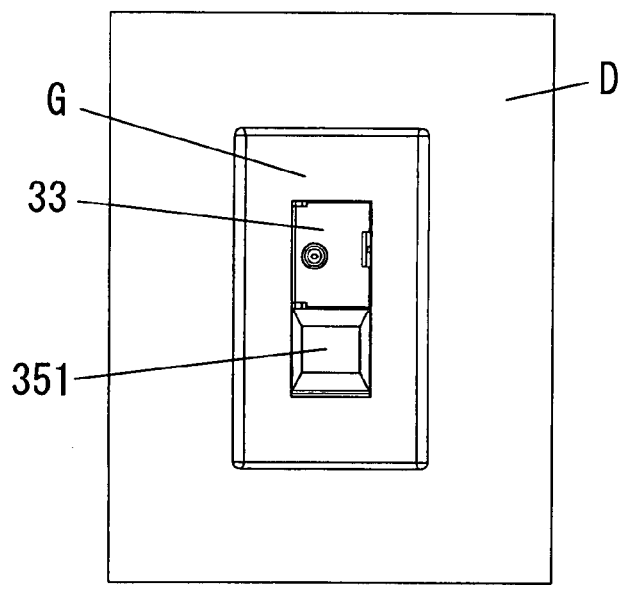
FIG. 21A is a front view of an embodiment which is installed on a wall and of which infrared sensor is directed backward.
Figure 21B:
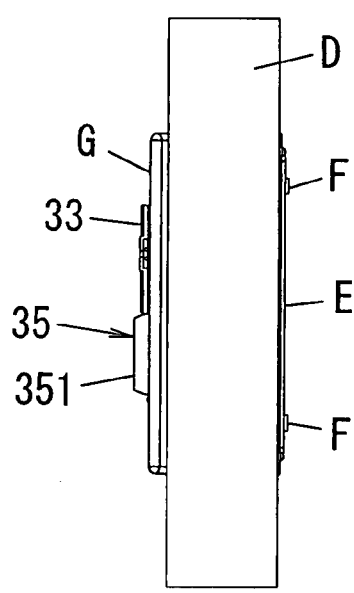
FIG. 21B is a side view of the embodiment of FIG. 21A.
Figure 21C:
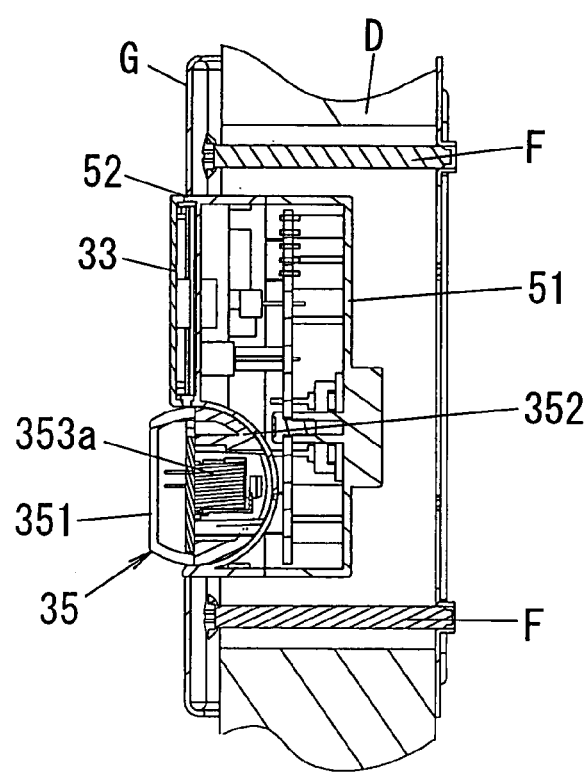
FIG. 21C is a sectional view of the embodiment of FIG. 21A.

In an embodiment, as shown in FIGS. 21A, 21B and 21C, the back of the body 351 of the sensor block 35 is flat. In this construction, when the sensor 353a is hidden into the cavity 326, the appearance of the front of the switch 1 can be improved.

Figure 22:
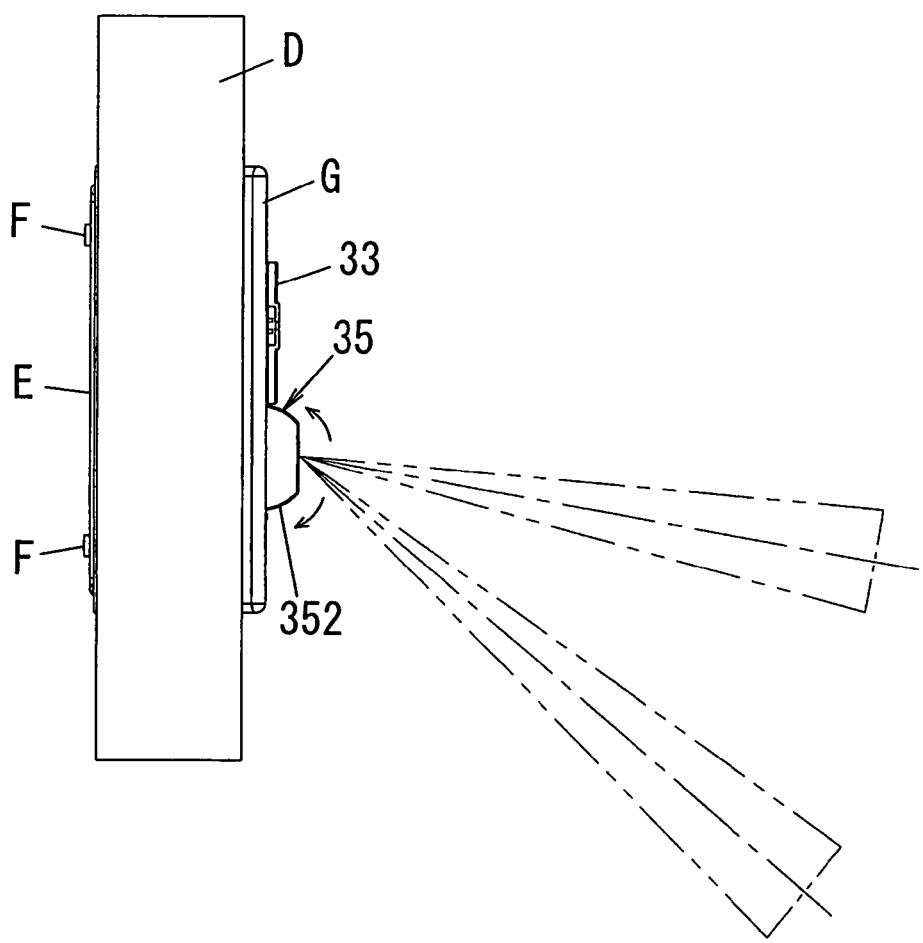
FIG. 22 is a side view of an embodiment.
Figure 23:
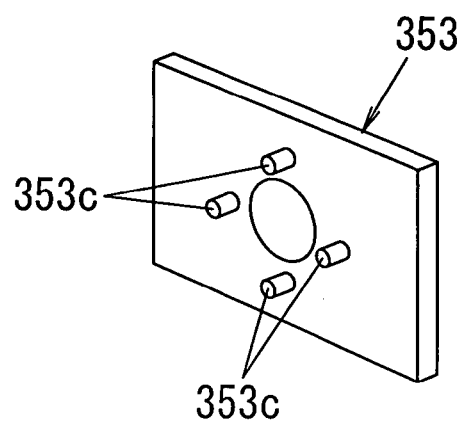
FIG. 23 illustrates an essential part of the embodiment of FIG. 22.

In an embodiment, as shown in FIGS. 22 and 23, the sensor circuit block 353 further comprises markers (353c) which are arranged around the infrared sensor 353a (not shown). Each marker 353c is, for example, a laser that emits a colored light, and the sensor 353a, the LED and each marker 353c are mounted on a printed circuit board of the block 353. In FIGS. 22 and 23, the upper marker 353c indicates the upper end of the detection range of the sensor 353a, and the lower marker 353c indicates the lower end of the detection range. The right marker 353c indicates the right end of the detection range, and the left marker 353c indicates the left end of the detection range. In this construction, the detection range of the infrared sensor 353*a* can be confirmed visually. However, not limited to this, the above markers (353*c*) may be applied to the first or second embodiment.

Although the present invention has been described with reference to certain preferred embodiments, numerous modifications and variations can be made by those skilled in the art without departing from the true spirit and scope of this invention.

The invention claimed is:

1. An infrared sensor switch, comprising
an infrared sensor with a detection range,
a controller that comprises the sensor for detecting whether or not a person is present in the detection range and controls an ON or OFF state of a corresponding load unit based on each detection result obtained from the sensor;
wherein the switch further comprises:
a sensor block comprising the sensor; and
a housing that is mounted in a wall and retains the sensor block so that a center of the detection range can be rotated about a horizontal axis up to at least 40 degrees downward from a forward direction of 0 degrees,
wherein the switch further comprises:
an address storage that stores an address related to the corresponding load unit; and
a transmitter that transmits a multiplexed transmission signal to the corresponding load unit through a main control unit, the main control unit transmitting the transmission signal based on a relationship between the address stored in the storage and the address related to the corresponding load unit based on the specified multiplexing;
wherein the corresponding load unit comprises:
at least one load;
a receiver for receiving a multiplexed transmission signal from the main control unit; and
a controller that, when a transmission signal including the address assigned to the load unit is received by the receiver, controls an ON or OFF state of said at least one load in accordance with a corresponding ON or OFF control code included in the transmission signal, respectively;
wherein the controller of the infrared sensor switch transmits a transmission signal including an ON or OFF control code to the corresponding load unit through the main control unit by generating a transmission signal, this transmission signal being generated based on a detection result obtained from the sensor, and including monitor data corresponding to an ON or OFF control code as well as the address stored in the storage, and being transmitted to the main control unit through the transmitter.

2. The infrared sensor switch of claim 1, further comprising a receiver for receiving an address from an external adapter that comprises an input device for entering the address and a transmitter for transmitting the address entered through the input device to the infrared sensor switch;
wherein, when the receiver of the infrared sensor switch receives an address from the adapter, the controller of the infrared sensor switch stores the received address in the address storage.

3. The infrared sensor switch of claim 2, wherein the transmitter of the adapter is a wireless transmitter, while the receiver of the infrared sensor switch is a wireless receiver.

4. The infrared sensor switch of claim 2, wherein the adapter is an address setting unit that is installed on a wall at a position lower than a person.

5. The infrared sensor switch of claim 2, further comprising a brightness sensor that detects an ambient brightness level;
wherein the load is a luminaire; and the controller of the infrared sensor switch keeps the load turned off regardless of each detection result obtained from the infrared sensor when the level detected by the brightness sensor is higher than a brightness reference level.

6. The infrared sensor switch of claim 2, further comprising an indicator for indicating each detection result obtained from the infrared sensor, wherein based on each detection result obtained from the infrared sensor, the controller of the infrared sensor switch drives the indicator so as to indicate each detection result obtained from the infrared sensor.

7. The infrared sensor switch of claim 2, wherein the sensor block has graduations, each of which represents an inclination of the center of the detection range.

8. The infrared sensor switch of claim 2, further comprising a holding time adjuster that adjusts a holding time for holding an ON state of the load unit from a point in time at which the detection result that a person is present in the detection range is obtained from the infrared sensor;
wherein the controller of the infrared sensor switch keeps the load unit turned on during the holding time after the detection result that a person is present in the detection range is obtained from the infrared sensor.

9. The infrared sensor switch of claim 8, further comprising a forced-ON switch and a forced-OFF switch included in the holding time adjuster,
wherein the controller of the infrared sensor switch is configured:
to transmit a transmission signal including the ON control code to the corresponding load unit through the main control unit regardless of each detection result obtained from the infrared sensor when the forced-ON switch is operative, the transmission signal being transmitted by generating a transmission signal including monitor data corresponding to the ON control code as well as the address stored in the address storage to transmit the transmission signal to the main control unit through the transmitter; and
to transmit a transmission signal including the OFF control code to the corresponding load unit through the main control unit regardless of each detection result obtained from the infrared sensor when the forced-OFF switch is operative, the transmission signal being transmitted by generating a transmission signal including monitor data corresponding to the OFF control code as well as the address stored in the address storage to transmit the transmission signal to the main control unit through the transmitter.

10. The infrared sensor switch of claim 2, further comprising a forced-ON switch and a forced-OFF switch,
wherein the controller of the infrared sensor switch is configured:
to transmit a transmission signal including the ON control code to the corresponding load unit through the main control unit regardless of each detection result obtained from the infrared sensor when the forced-ON switch is operative, the transmission signal being transmitted by generating a transmission signal including monitor data corresponding to the ON control code as well as the address stored in the address storage to transmit the transmission signal to the main control unit through the transmitter; and
to transmit a transmission signal including the OFF control code to the corresponding load unit through the main control unit regardless of each detection result obtained from the infrared sensor when the forced-OFF switch is operative, the transmission signal being transmitted by generating a transmission signal including monitor data corresponding to the OFF control code as well as the address stored in the address storage to transmit the transmission signal to the main control unit through the transmitter.

11. The infrared sensor switch of claim 2, further comprising a drive means for rotating the sensor block so that the center of the detection range rotates about the horizontal axis, wherein in accordance with an external signal including an UP or DOWN instruction, the controller of the infrared sensor switch rotates the block through the drive means so that the center of the detection range is rotated about the horizontal axis at every specified interval of time.

12. The infrared sensor switch of claim 1, wherein the housing retains the block so that the center of the detection range can be rotated about the horizontal axis from the forward to a backward direction to hide a front of the sensor with the housing.

13. The infrared sensor switch of claim 12, wherein the housing retains the block so that the center of the detection range can be rotated about the horizontal axis up to 180 degrees downward and then backward from the forward direction.

* * * * *